(12) United States Patent
Ju et al.

(10) Patent No.: US 11,100,504 B2
(45) Date of Patent: Aug. 24, 2021

(54) SYSTEMS AND METHODS FACILITATING ACCOUNT ACCESS DELEGATION

(71) Applicant: PAYPAL, INC., San Jose, CA (US)

(72) Inventors: Yona Ju, San Jose, CA (US); Fun-Chen Jou, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 20 days.

(21) Appl. No.: 16/237,208

(22) Filed: Dec. 31, 2018

(65) Prior Publication Data
US 2020/0211016 A1 Jul. 2, 2020

(51) Int. Cl.
*G06Q 40/02* (2012.01)
*G06Q 20/40* (2012.01)
*H04L 29/06* (2006.01)

(52) U.S. Cl.
CPC ..... *G06Q 20/4014* (2013.01); *G06Q 20/4016* (2013.01); *G06Q 40/02* (2013.01); *H04L 63/0884* (2013.01)

(58) Field of Classification Search
CPC . G06Q 20/4014; G06Q 20/4016; G06Q 40/02
See application file for complete search history.

(56) References Cited

U.S. PATENT DOCUMENTS

| | | | |
|---|---|---|---|
| 7,006,993 B1* | 2/2006 | Cheong | G06Q 20/02 705/35 |
| 9,652,604 B1* | 5/2017 | Johansson | H04W 12/068 |
| 2004/0107163 A1* | 6/2004 | Dutta | G06Q 40/02 705/39 |
| 2006/0235795 A1* | 10/2006 | Johnson | G06Q 20/02 705/44 |
| 2015/0058950 A1* | 2/2015 | Miu | H04L 63/08 726/7 |
| 2016/0162897 A1* | 6/2016 | Feeney | G06Q 20/065 705/71 |
| 2017/0169424 A1* | 6/2017 | Maddocks | G06Q 20/3821 |
| 2020/0213310 A1* | 7/2020 | Ju | G06Q 20/3821 |

* cited by examiner

*Primary Examiner* — Mike Anderson
*Assistant Examiner* — Matthew Cobb
(74) *Attorney, Agent, or Firm* — Haynes and Boone, LLP

(57) ABSTRACT

System and method for facilitating account access delegation are provided. Login credentials are authenticated for a first account of a first funding source of a first user. A request from the first user to delegate, to a second account of a second user, access to the first funding source is received. A redirected login request from a merchant web application is further received. The redirected login request corresponds to the second account. A determination is made, based on the received request, that the second account is permissioned to use the first funding source. In response to the determination, a login of the first user account is caused on the merchant web application. The logging in of the first user account on the merchant web application causes the first funding source to be applied to an electronic transaction performed on the merchant web application under control of the second user.

20 Claims, 6 Drawing Sheets

Select an Account

You

— 402

Select — 404

Your Mother

— 412

Select — 414

Cancel — 420

SYSTEMS AND METHODS FACILITATING ACCOUNT ACCESS DELEGATION

BACKGROUND

Field of the Disclosure

The present disclosure generally relates to electronic account security, and more particularly, to account access and use between linked users.

Related Art

More and more consumers are purchasing items and services and/or otherwise conducting transactions over electronic networks such as, for example, the Internet. Consumers routinely purchase products and services from merchants and individuals alike. The transactions may take place directly between a conventional or on-line merchant or retailer and the consumer, and payment is typically made by entering credit card or other financial information. Transactions may also take place with the aid of an on-line or mobile transaction service provider such as, for example, PayPal, Inc. of San Jose, Calif. Such electronic transaction service providers can make transactions easier and safer for the parties involved. Conducting transactions with the assistance of a service provider from the convenience of virtually anywhere using a mobile device is one main reason why on-line and mobile transactions are growing very quickly.

An example related use case includes a first user having a service provider account. The first user desires to allow a second user to purchase items using a funding source associated with the service provider account. For instance, a daughter in North America may have a service provider account, and she wishes to allow her mother in Asia to make purchases or transfer funds using one of the daughter's funding sources. A temptation is for the daughter to share her login and password of the service provider account with her mother. However, such use is typically frowned upon, as it is generally considered to be insecure. Also, the risk analysis processes in the background of the service provider notice that people on different continents and with different smart phones are using the same account, and the service provider may interpret that as fraud and perhaps shut down the transactions or lockup the account, or a minimum, require the mother to provide additional authentication credentials, which the mother may not know or have, resulting in a failed login.

Despite being insecure, users continue to share login and password information with each other. Temptation may arise when a user desires to purchase something (e.g., a plane ticket) that requires entry of personal information. Returning to the use case above, the daughter may hesitate to buy a plane ticket for her mother because the daughter may not know all of her mother's personal information to be able to fill purchasing fields on the airline website. Thus, the daughter may be tempted to provide her service provider login and password to her mother so that her mother can be the one to enter the information on the airline website and make payment. As noted above, sharing a login and password may be dangerous. For instance, the mother's user device may be compromised, allowing malicious actors to access the daughter's login and password. Also, it is possible that the daughter's trust in her mother may be displaced, as the mother may abuse her privileges by making additional purchases.

Thus, there is a need to enable account access and use without compromising account security and other disadvantages of conventional systems and methods.

Figure 1:
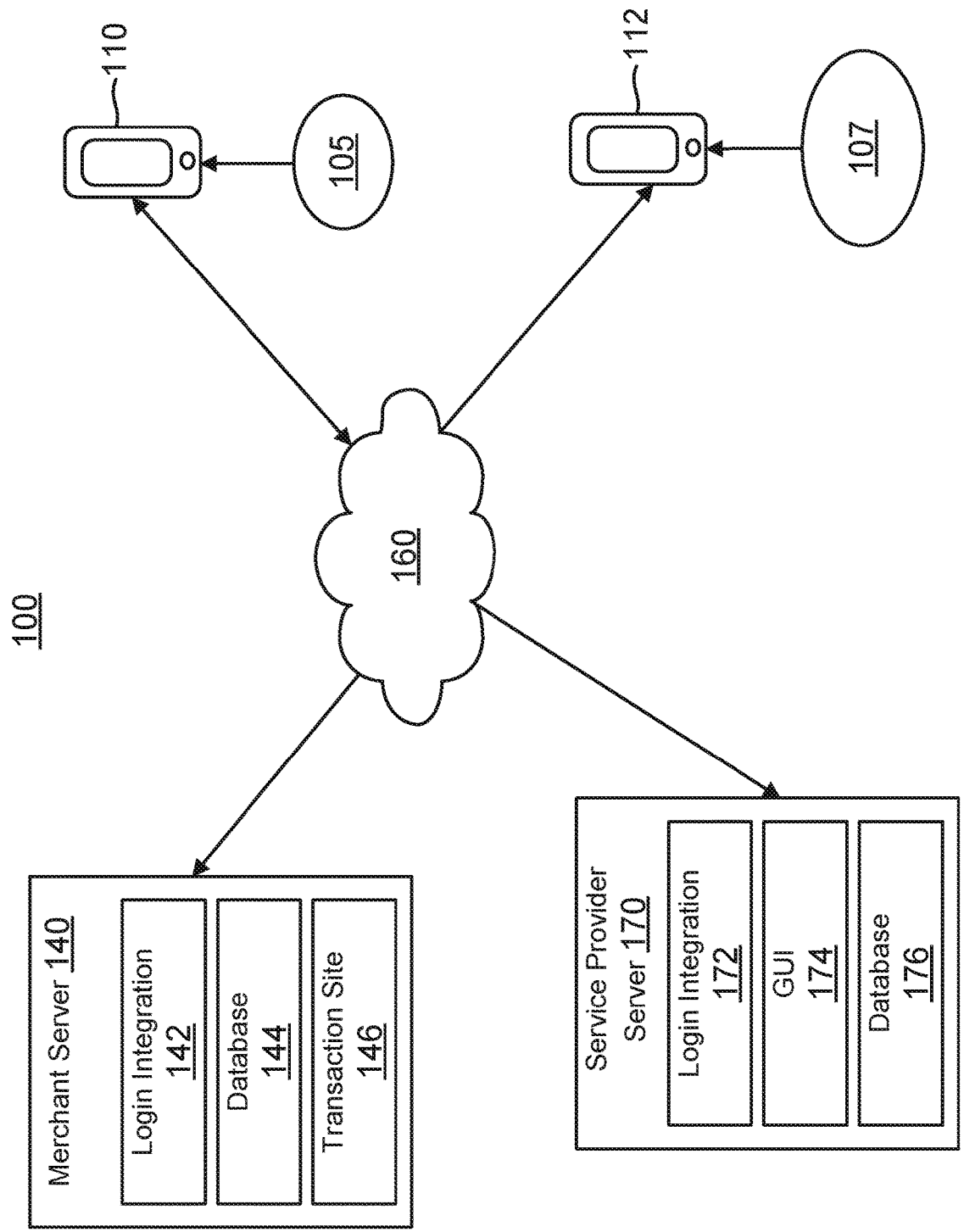
FIG. 1 is an illustration of an electronic processing system, including multiple components communicatively coupled via a network, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods for delegating account use from one user to another user, thereby reducing or eliminating the temptation to share a service provider account login and password, resulting in improved online account security. Specifically, the first user may be delegated access by the second user. In one example, the second user may provide permission for the first user to use a funding source of the second user when the first user logs in to a merchant website using the first user's account credentials.

Returning to a mother and daughter example, though this time the mother and daughter both live in North America, and the mother desires to provide the daughter access to the mother's funding source. Furthermore, this example assumes that the mother and daughter both have separate accounts with a service provider and the mother has an account with a merchant, where the merchant account is linked to the mother's service provider account to allow the mother to login to the merchant using the mother's service provider account credentials. An example set up process includes the mother logging in to her service provider account using her own credentials. For instance, the mother may sip in to her service provider account using a website or application of the service provider. The service provider website has an interface that allows the mother to identify her daughter, identify one or more merchants, and set restrictions on her daughter's use of the account. Examples of restrictions that the mother may set include selecting only particular funding sources, restrictions on dollar amounts of purchases, a time window outside of which the daughter may not use the account, type of merchant, type of merchandise within shopping carts (e.g., yes to school supplies, no to beer).

Continuing with the example, once set up is complete, the mother has delegated use of her account to her daughter in accordance with the restrictions that the mother set. The mother may then inform the daughter of the permission by sending a text message or email herself, or the service provider may send a message by text or other means to the daughter.

The daughter may then desire to make a purchase using her mother's funding source. The daughter then goes to a merchant website, where the merchant website is identified by the mother as being allowed. The merchant website may include an option for logging in using a service provider account instead of (or in addition to) logging in using credentials specifically for the merchant website. In other words, the merchant website may have accounts that are linked to accounts at the service provider to allow some users to login to the merchant website and pay for purchases using the service provider credentials.

Further continuing with this example, the daughter selects the option to login to the merchant website using her service provider account credentials. The daughter may enter her own service provider account credentials into the merchant website. The merchant website may then communicate with a login facility of the service provider, where the service provider authenticates the daughter according to her own credentials, determines that the daughter has permission to use her mother's funding source at the merchant, and then returns an indication of authentication to the merchant website according to the mother's service provider account. Therefore, from the merchant's point of view, the mother is logged in to the mother's merchant account using a linked service provider account of the mother.

Once the daughter is logged in as her mother, she may make a variety of purchases by selecting items to place into a shopping cart. At check out, the merchant website may provide details of the purchase to the service provider, and the service provider applies any restrictions (e.g., dollar amount, type of purchase, and the like) to the purchase as a whole or item by item. Assuming that the purchases are allowed by the restrictions, the service provider uses one or more of the mother's funding sources to pay for the purchases at the merchant website. However, the transaction as a whole, or purchase of some specific items, may be prohibited and denied by the service provider at check out.

Once the electronic transaction is complete, the daughter may then log out or simply leave the merchant website. Accordingly, the service provider may provide a seamless account delegation from the mother to the daughter by storing permissions and restrictions and then applying those permissions and restrictions during the electronic transaction. Furthermore, as described above, the service provider itself mediates the login, taking advantage of a linking between merchant website accounts and service provider accounts.

Various embodiments may provide one or more advantages over related art systems. For instance, various embodiments of the present disclosure may allow a first user (e.g., the daughter) to have delegated access to a funding source of a second user (e.g., the mother) under conditions that are generally expected to maintain security of the second user's funding source. For instance, the first user uses her own service provider account credentials, thereby eliminating or reducing the temptation to share account credentials between users. Furthermore, the second user may set various restrictions when delegating use to the first user, thereby protecting the second user against abusive purchasing by the first user. From the perspective of the service account provider, various embodiments may advantageously allow the funding source sharing while at the same time using already built in risk modeling and fraud prevention so that the purchases by the first user are performed in the normal course. This may increase efficiency and security of electronic transactions. Additionally, the merchant may experience increased efficiency and security through offloading authentication to the service provider.

Of course, the scope of embodiments is not limited only to making payments. Rather, intermediating account access by the service provider can be applied to account access in general. For example, just by logging into an account of another user, the concepts described herein may enable activity such as sharing membership perks and content (e.g., streaming content), sharing a saved shopping cart in progress, collaborating on a task such as a document, a to do list, an itinerary, and the like, and to help a person set up her account (e.g., tech support for parents). Thus, while the example use case of FIGS. 1-5 are directed toward making a payment at a merchant, it is understood that delegating use to the first user may in some instances not necessarily include making a payment or accessing a funding source.

FIG. 1 is block diagram of a networked system suitable for implementing account delegation according to an embodiment. Networked system 100 may include a plurality of servers and/or software components that operate to perform various payment transactions or processes. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

System 100 may include a user device 110, another user device 112, a merchant server 140, and a service provider server 170 in communication over a network 160. Service provider server 170 may be maintained by a payment service provider, such as PayPal, Inc. of San Jose, Calif. A user 105, such as a consumer, may utilize user device 110 to perform an electronic transaction using service provider server 170. Similarly, a user 107 may utilize user device 112 to perform an electronic transaction using service provider server 170. However, for simplicity, the following example will refer to user 105 and user device 110, and it is understood that the same applies to the user 107 and user device 112 as well.

For example, user 105 may utilize user device 110 to visit a merchant's web site provided by merchant server 140 or the merchant's brick-and-mortar store to browse for products offered by the merchant. Further, user 105 may utilize user device 110 to initiate a payment transaction, receive a transaction approval request, or reply to the request. User 105 may utilize the device 110 to set up account delegation, including identifying other accounts that may use a first account and setting restrictions on their use. Note that transaction, as used herein, refers to any suitable action performed using the user device, including payments, transfer of information, display of information, etc. Although only one merchant server 140 is shown, a plurality of merchant servers may be utilized if the user is purchasing products from multiple merchants.

User device 110, user device 112, merchant server 140, and service provider server 170 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160. Network 160 may be implemented as a single network or a combination of multiple networks. For example, in various embodiments, network 160 may include the Internet or one or more intranets, landline networks, wireless networks, and/or other appropriate types of networks.

User device 110 (and user device 112) may be implemented using any appropriate hardware and software configured for wired and/or wireless communication over network 160. For example, in one embodiment, the user device 110 may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 110 (and user device 112) may include one or more browser applications which may be used, for example, to provide a convenient interface to permit user 105 to browse information available over network 160. For example, in one embodiment, a browser application may be implemented as a web browser configured to view information available over the Internet, such as a user account for online shopping and/or merchant sites for viewing and purchasing goods and services.

User device 110 also may include other applications to perform functions, such as email, texting, voice and IM applications that allow user 105 to send and receive emails, calls, and texts through network 160, as well as applications that enable the user to communicate, transfer information, make payments, and otherwise utilize make purchases and set up account delegation through the payment provider as discussed herein.

Merchant server 140 may be maintained, for example, by a merchant or seller offering various products and/or services. The merchant may have a physical point-of-sale (POS) store front. The merchant may be a participating merchant who has a merchant account with the payment service provider. Merchant server 140 may be used for POS or online purchases and transactions. Generally, merchant server 140 may be maintained by anyone or any entity that receives money, which includes charities as well as retailers and restaurants. For example, a purchase transaction may be payment or gift to an individual.

Merchant server 140 may include a database 144 identifying available products and/or services (e.g., collectively referred to as items) which may be made available for viewing and purchase by user 105. Accordingly, merchant server 140 also may include a transaction site 146 which may be configured to serve information over network 160 to a browser of user device 110 or user device 112. In one embodiment, users 105 and 107 may interact with transaction site 146 through browser applications over network 160 in order to view various products, food items, or services identified in database 144.

Transaction site 146 may also be configured to facilitate the purchase by users 105 and 107 of goods or services online or at a physical POS or store front. Transaction site 146 may be configured to accept payment information from or on behalf of user 105 or user 107 through service provider server 170 over network 160. For example, transaction site 146 may receive and process a payment confirmation from service provider server 170, as well as transmit transaction information to the payment service provider and receive information from the payment service provider (e.g., a transaction ID). Transaction site 146 may be configured to receive payment via a plurality of payment methods including cash, credit cards, debit cards, checks, money orders, or the like.

In this example, merchant server 140 processes credit card transactions, either by itself or credit card transactions that are further processed through service provider server 170. Furthermore, user devices 110 and 112 may allow for the users 105 and 107 to pay for a good or a service at the merchant server 140 either via direct use of a credit card or via a funding source managed by service provider server 170, where a digital wallet stores information associated with the funding source.

Merchant server 140 also includes login integration application 142, which maintains a record of user accounts (e.g., in database 144) that are also linked to user accounts associated with the service provider. Accordingly, some users of transaction site 146 may be able to sign into transaction site 146 using their service provider account credentials instead of or in addition to credentials specifically for transaction site 146.

Service provider server 170 may be maintained, for example, by an online payment service provider which may provide payment between user 105 or user 107 and the operator of merchant server 140. In this regard, service provider server 170 may include one or more payment applications which may be configured to interact with user device 110, user device 112, and/or merchant server 140 over network 160 to facilitate the purchase of goods or services, communicate/display information, and send payments by user 105 or user 107.

Service provider server 170 also maintains a plurality of user accounts, each of which may include account information associated with consumers, merchants, and funding sources, such as credit card companies. For example, account information may include private financial information of users of devices such as account numbers, passwords, device identifiers, user names, phone numbers, credit card information, bank information, or other financial information which may be used to facilitate online transactions by user 105 or user 107. Account information may also include user purchase history and user ratings. Advantageously, service provider server 170 may be configured to interact with merchant server 140 on behalf of user 105 or user 107 during a transaction with transaction site 146 to track and manage purchases made by users when funding sources are used. The service provider server 170 may store the account information at database 176 or other appropriate location.

Service provider server 170 may be configured to receive information from a user device and/or merchant server 140 for processing and storage in a database 176. Service provider server 170 may include one or more applications to process information from user 105 or user 107 for processing an order and payment using various selected funding instruments. As such, service provider server 170 may store details of an order from individual users, including funding source used, credit options available, estimated delivery day(s), actual delivery date/time, description of the purchased item(s), etc. Service provider server 170 may be further configured to determine the existence of and to manage accounts for user 105 and user 107, as well as create new accounts and delegate access to one or more accounts as appropriate.

In this example embodiment, login integration application 172 stores and accesses service provider account information at database 176 to facilitate account delegation and also to provide user login at transaction site 146 using service provider account credentials. For instance, login integration application 172 may store information at database 176 to indicate which particular user accounts are associated with one or more user accounts maintained by the merchant server 140. In one example, login integration application 172 includes various application programming interfaces (APIs) to communicate with a login web element at transaction site 146 to receive service provider account credentials through the login web element and then to return an indication of authentication to the transaction site 146 via login integration application 142.

For instance, after receiving service provider account credentials from the transaction site 146, the login integration application 172 may search database 176 to identify a particular service provider account and to authenticate the user assuming the credentials are correct. Login integration application 172 may also determine that the particular user credentials are associated with the account delegation for another account and allow the user who is logging in to the transaction site 146 to login as the user of the other account. The login integration application 172 may then provide an authentication indication to transaction site 146 for either an account of the user that is attempting to login or an account to which the user has been delegated access.

In one example, user 105 has a service provider account maintained by service provider server 170, and user 107 also has a service provider account maintained by service provider server 170. Furthermore, user 105 has an account for transaction site 146, where the transaction site account is linked to the service provider account of user 105 by information at databases 144 and 176. Accordingly, user 105 can login to transaction site 146 using either credentials specifically for transaction site 146 or by using service provider account credentials of user 105. Login integration applications 142 and 172 cooperate to allow user 105 to login using service provider account credentials, as noted above. Furthermore, in this example, user 105 may access her service provider account via a graphical user interface (GUI) 174 to set up delegation to user 107 and set restrictions on use by user 107. Login integration application 172 may save information regarding the delegation and the restrictions at database 176. As explained in further detail below, user 107 may then login to the transaction site 146 as user 105, with the permission of user 105, to make one or more purchases using a funding source associated with the service provider account of user 105.

Figure 2:
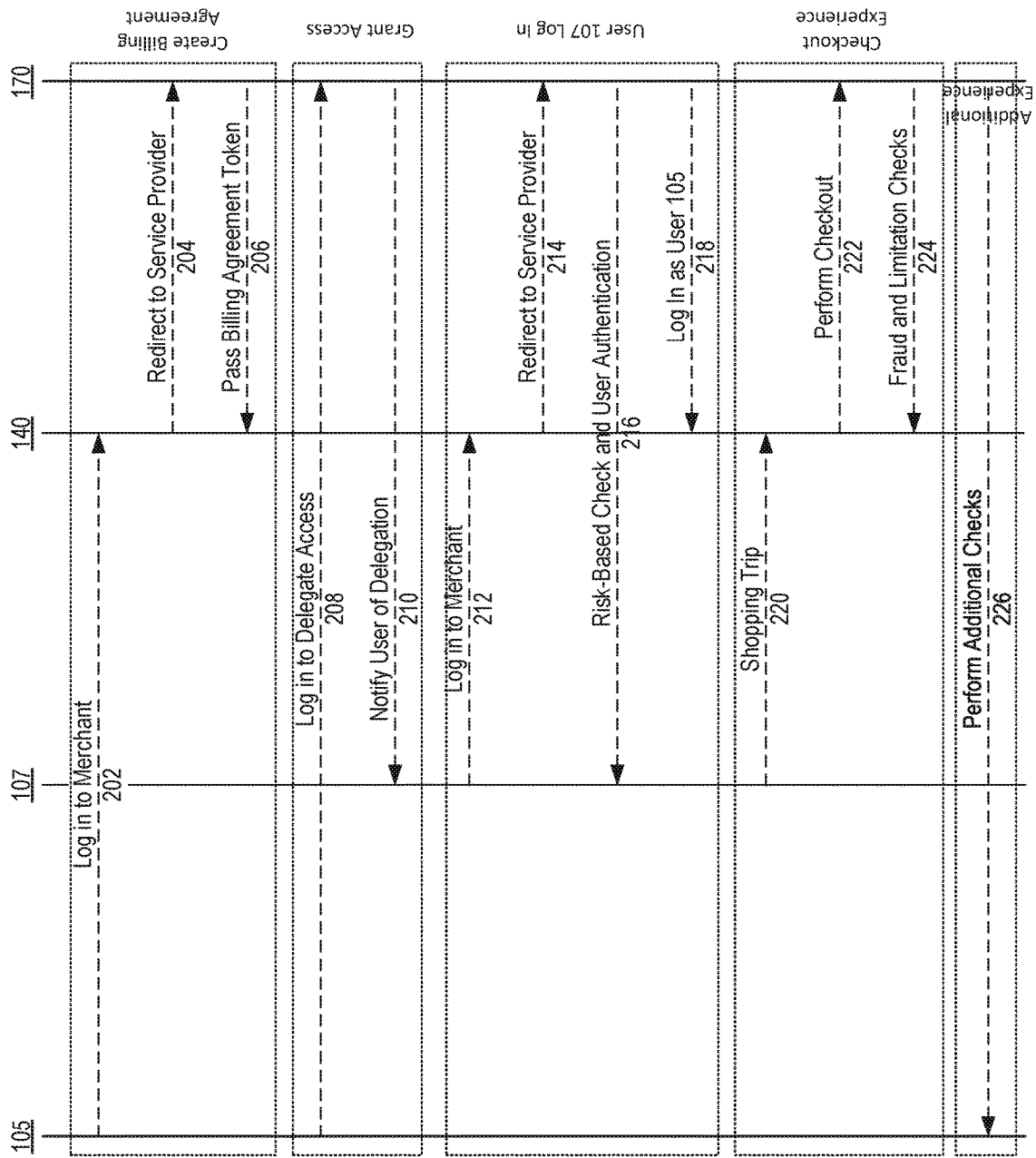
FIG. 2 is an illustration of an example process for setting up and using account delegation, according to one embodiment.

FIG. 2 is an illustration of an example process 200, according to one embodiment, to delegate access from an account of a user 105 to an account of a user 107 for shopping at a merchant utilizing a service provider. Example process 200 is described from the perspectives of the user 105, the user 107, the merchant server 140 and the service provider server 170. It is understood that actions of the user 105 and the user 107 are performed via their interactions with respective user devices 110, 112.

At step 202, the user 105, who already has a service provider account, accesses transaction site 146 by logging on to the transaction site 146 on a merchant server 140 using her service provider account credentials. Alternatively, user 105 may log on to the transaction site 146 using her account credentials for the particular merchant. If user 105 uses her service provider account login, the login integration applications 142, 172 may cooperate to allow this login, including login integration application 172 mediating the login and providing authentication. Such action may establish a link between an account managed and recorded by transaction site 146 and the service provider account of user 105. In one embodiment, the merchant server 140, upon entry of the service provider account credentials, may redirect the transaction site 146 to the service provider site as shown in step 204. Once redirected, user 105 may agree to a billing agreement that allows the service provider to be added as a payment option while shopping with the merchant associated with the merchant server.

Alternatively, in some embodiments, if user 105 logs in using merchant credentials, the login integration applications 142, 172 may coordinate with service provider server 170 to integrate the merchant log in with the service provider log in. For example, the logging in of user 105 into the merchant may cause the merchant to link to the service provider for a funding instrument to be used on this particular shopping trip. In other words, the merchant and the service provider logins may be linked.

In step 206, the service provider server 170 may pass a billing agreement token hack to the merchant server 140 to establish the billing agreement. The login integration application 142 may also store information regarding service provider account of user 105 in database 144. Similarly, login integration application 172 may store information regarding the service provider account of user 105 and its association with the transaction site 146 in database 176.

Once the billing agreement is established, user 105 may at a later time login to her service provider account with the intent of delegating access to other users in step 208. For example, user 105 may grant access to user 107 while also establishing restrictions for the user 107 when making purchases from the merchant. For instance, user 105 may access a "settings" application provided by service provider server 170 via GUI 174, where the settings application allows user 105 to change a number of settings, including delegating access and establishing restrictions according to the examples herein.

Figure 3:
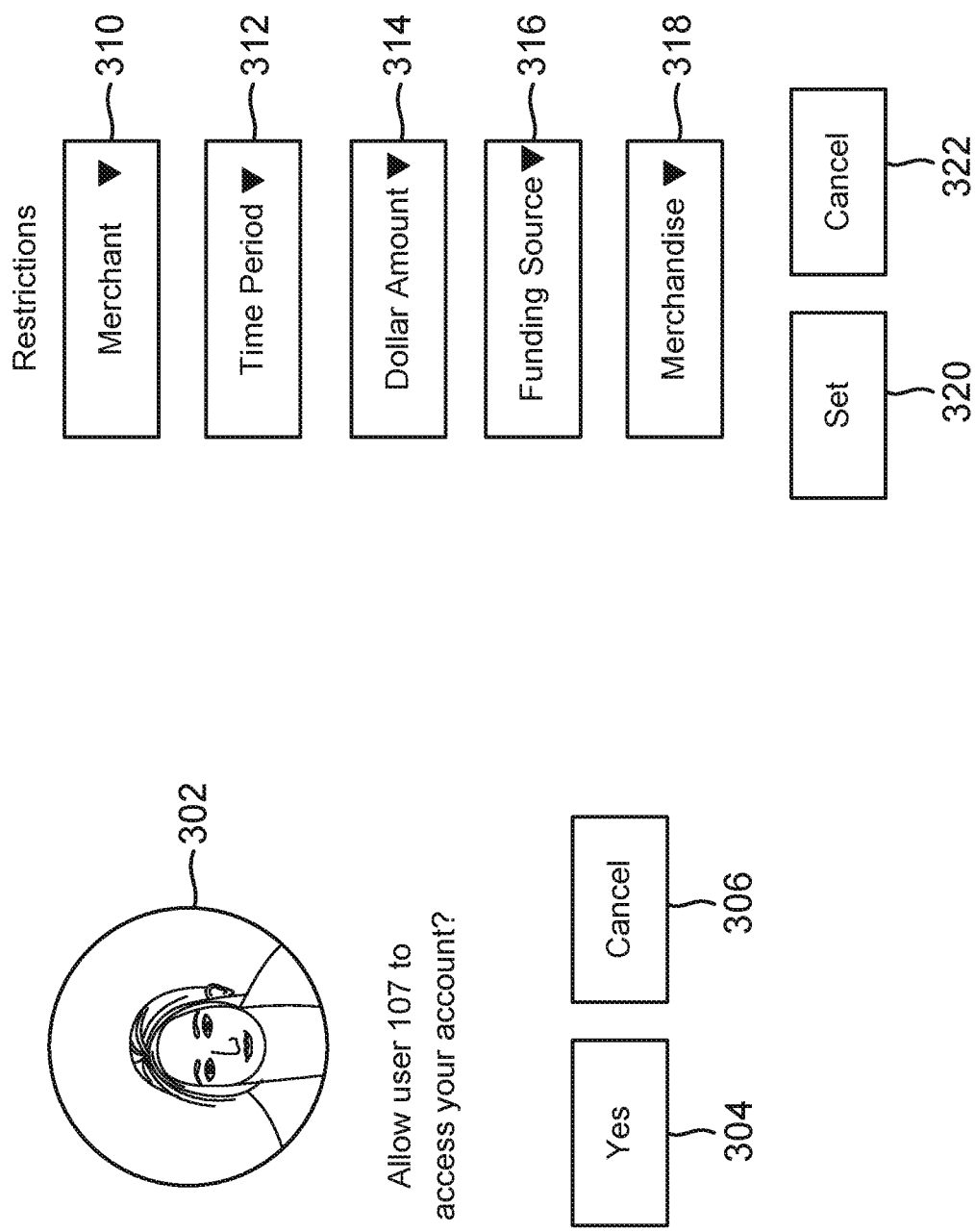
FIG. 3 is an illustration of a user interface for setting up account delegation, including setting one or more restrictions, according to one embodiment.

An illustration of a settings webpage that may be provided by service provider server 170 via GUI 174 to allow user 105 to delegate access to her account, according to one embodiment, is provided in FIG. 3. User 105 may be provided an option to allow user 107 to access the account of user 105. Specifically, in this example a photo 302 of user 107 may be presented with a prompt, "allow user 107 to access your account?" as well as a yes button 304 and a cancel button 306. Upon selection of yes button 304, service provider server 170 establishes permission of a service provider account of user 107 to use the service provider account of user 105 for making purchases.

In some embodiments, the service provider server 170 presents options for the user 105 to establish a set of restrictions. In one example, pulldown menu 310 may allow user 105 to select that menu and to see a multitude of different participating merchants that have accounts that link to service provider accounts. In this example, the merchant associated with transaction site 146 may be one of the merchants listed at menu 310. Accordingly, user 105 may select one or more of the merchants from menu 310.

Menu 312 may allow user 105 to set a time period in which transactions by user 107 must be completed, and transactions by user 107 outside that set time period may be disallowed. Menu 314 may allow user 105 to enter a maximum dollar amount, either by transaction or in total, for purchases made by user 107.

Menu 316 may allow user 105 to select one or more funding sources associated with a digital wallet maintained by service provider server and associated with the service provider account of user 105. Examples of funding sources may include particular credit cards, bank accounts, gift certificates, and the like. Accordingly, user 105 may employ menu 316 to restrict purchases by user 107 to particular funding sources.

Menu 318 may allow user 105 to set restrictions based upon a type of merchandise for purchase by user 107. In other words, user 107 may be limited to purchasing items within certain categories or may be excluded from purchasing items in other categories according to restrictions set using menu 318. One example includes allowing user 107 to purchase school supplies or food, but disallowing purchases of tobacco or alcohol.

Of course, the restrictions illustrated in FIG. 3 at menu 310-318 are exemplary and used here to provide non-limiting illustrations of functionality. Other embodiments may apply any number of appropriate restrictions to a transaction, such as time, day, number/frequency, amount, merchant, merchandise type, service type, or other data-based restrictions. After user 105 has selected restrictions to apply, user 105 may either select the set button 320 or the cancel button 322. By selecting the set button 320, service provider server establishes the set of restrictions according to the input of user 105 through the GUI illustrated by FIG. 3.

Returning to FIG. 2, merchant server 170 sends a notification to user 107 of the delegation in step 210. In some embodiments, the restrictions instituted by user 105 may be included in the notification. The notification may be transmitted in one or more of forms including short message service (SMS), email, application notification, or other appropriate technique. An example notification may indicate that user 105 has delegated access for user 107 to make a travel purchase with a $300 budget.

In step 212, user 107, upon being notified of the delegation, may log in to the merchant (e.g., transaction site 146) using the service provider account credentials of user 107. For instance, user 107 may log in by going to the merchant website and entering user credentials belonging to user 107 and associated with merchant server 140. Alternatively, user 107 may log into the service provider using user credentials belonging to user 107, and then link to the merchant website from through service provider.

At step 214, merchant server 140 redirects user 107 to the service provider server 170 to log in using service provider credentials of user 107. Upon log in, service provider server 170 may authenticate user 107 by confirming that a login and password entered by user 107 correctly corresponds to a particular service provider account associated with user 107. Alternatively, or in addition, the service provider may run a risk-based check to validate user 107 in step 216. In some embodiments, the risk-based check of the validation process may include checking for consistency in device identifier, user information, operating system, browser used, device IP address, etc., of user 107. The service provider may further perform two-factor authentication (2FA) to ensure the identity of user 107.

In some embodiments, 2FA may be accomplished by sending a (short message service) SMS or email to a phone number or email address associated with user 107's account to confirm user 107's identity. In one example user 107 logs in to the merchant website using user 105's username/password. Service provider may then serve up an SMS authentication to user 107's device 112 rather than to user 105's device 110. The same functionality may be applied to interactive voice response (IVR), email codes, links, and other forms of 2FA by serving it to device 112 of user 107. Additionally or alternatively, service provider server 170 may subject user 107 to knowledge-based authentication (KBA) by asking questions that pertain to either one or both of user 105 and user 107. In any event, various embodiments may apply any secure method to authenticate user 107 as appropriate for a given transaction. Service provider 170 is able to perform the 2FA since service provider 170 possesses account information on both user 105 and user 107 from account sign ups.

Once validated, the service provider instructs merchant server 140 to log into the account of user 105 so that the account of user 105 may be charged for the ensuing purchase in step 218.

For example, when user 105 uses log in with service provider with granted access from user 107, the service provider masks user 105's login so that from the perspective of the merchant, it appears that user 107 is logged in. Upon cart check out, the service provider may run cart-level limitation check and default the funding source to user 107's funding source as the service provider knows this is a delegated access. For restricted features such as updating password and/or personal/contact information, the merchant would need to inform the service provider what pages are being called. Thus, if user 107 attempts to access restricted features, when the restricted feature (e.g., profile edit page) is called, the service provider would block access. In some embodiments, this may be accomplished in the background. That is, when the service provider sees that user 107 is logging in with consistency from trusted elements such as a known IP or device, no further instruction is given to 140 other than to log in. Alternatively, step-up authentication (e.g., 2FA) may be used to validate identity, after which successful login instruction may be granted.

Figure 4:
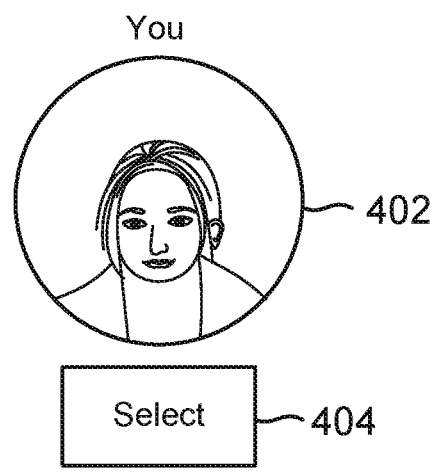
FIG. 4 is an illustration of an example interface for a user logging in to an account to access account delegation, according to one embodiment.
Figure 4:
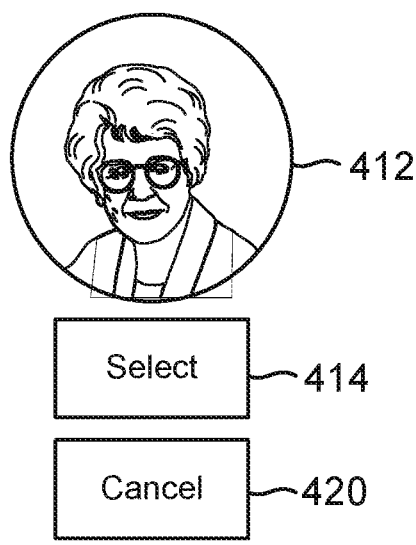

FIG. 4 provides an illustration of a webpage presented to user 107 during the authentication process, according to one embodiment. In some instances, the user 107 may have an account associated with transaction site 146, such as if user 107 has already logged in to transaction site 146 using her service provider account credentials. In such an instance, login integration application 172 may provide user 107 with the choice to login with a prompt "select an account." In the example of FIG. 4, user 107 may login as herself by clicking button 404, which is proximate a photo 402 of user 107. In the example of FIG. 4, user 105 is the mother of user 107, and the prompt includes a photo 412 of the mother proximate button 414. User 107 may then select either button 404 or 414 (or cancel button 420). The example of FIG. 2 assumes that user 107 logs in as her mother, user 105.

In step 220, user 107 may make purchase selections and execute transactions on the transaction site 146. For instance, the user may browse shopping items at transaction site 146 and choose one or more of those items to be placed into a shopping cart. As user 107 shops, merchant server 140 view user 107 as logged into user 105's account with the attached payment instruments. In other words, as far as merchant server 140 is concerned, user 105 conducts the resulting transaction of the shopping trip. Thus, upon checkout in step 222, merchant server 140 calls service provider server 170 to initiate the checkout process. In this instance, the service provider server 170 knows user 107 has shopped, but that user 105 is providing the funding instrument for the transaction, and as a result, it appears to the merchant server 140 as if user 105 is conducting the transaction.

Service provider 170 may further run additional risk-based and limitations check on user 107's shopping trip at step 224. The risk-based check may include the adjudication of whether the account has been taken over by a bad actor. This check may be based on failed log in attempts, inconsistent IP addresses and/or device identifiers, as well as a host of other factors known in the art. The limitations check determines whether user 107's activities are within the bounds of the restrictions previously set by user 105. For example, the limitations check may determine whether the purchase is being made from a product category approved by user 105, within a monetary spending limit set by user 105, shipped to an approved address, and/or executed within a timeframe designated by user 105. In the event that the check fails, user 107 may be notified and may be provided an opportunity to amend the transaction. Alternatively, the transaction may simply be aborted.

After the transaction passes the limitations check, additional checks with regards to user 105's account may be necessary, in step 226. Service provider 170 may, for example, perform a check to ensure that the funding instrument provided by user 105 is usable at the selected merchant, and that the funding instrument can cover the transaction.

Once all the checks have been successfully completed, and the transaction consummated, the server provider may send a confirmation notification to user 105 indicating the completion of the transaction. The merchant may further send a receipt to user 105 as confirmation. Furthermore, the service provider may send notification to user 107 of the completion of the transaction since the merchant, thinking that user 105 was conducting the shopping trip, may not email user 107 at all.

Furthermore, service provider 170 may remember user logins for use at a later time. Service provider 170 accomplishes this by identifying the respective user based on device information, session information, IP address, browser information, and certain other unique identifier of the device being operated by the user. In some instances, an algorithm may be used to compile the information from the user devices to create fingerprints that uniquely identifies each of the user devices.

Figure 5:
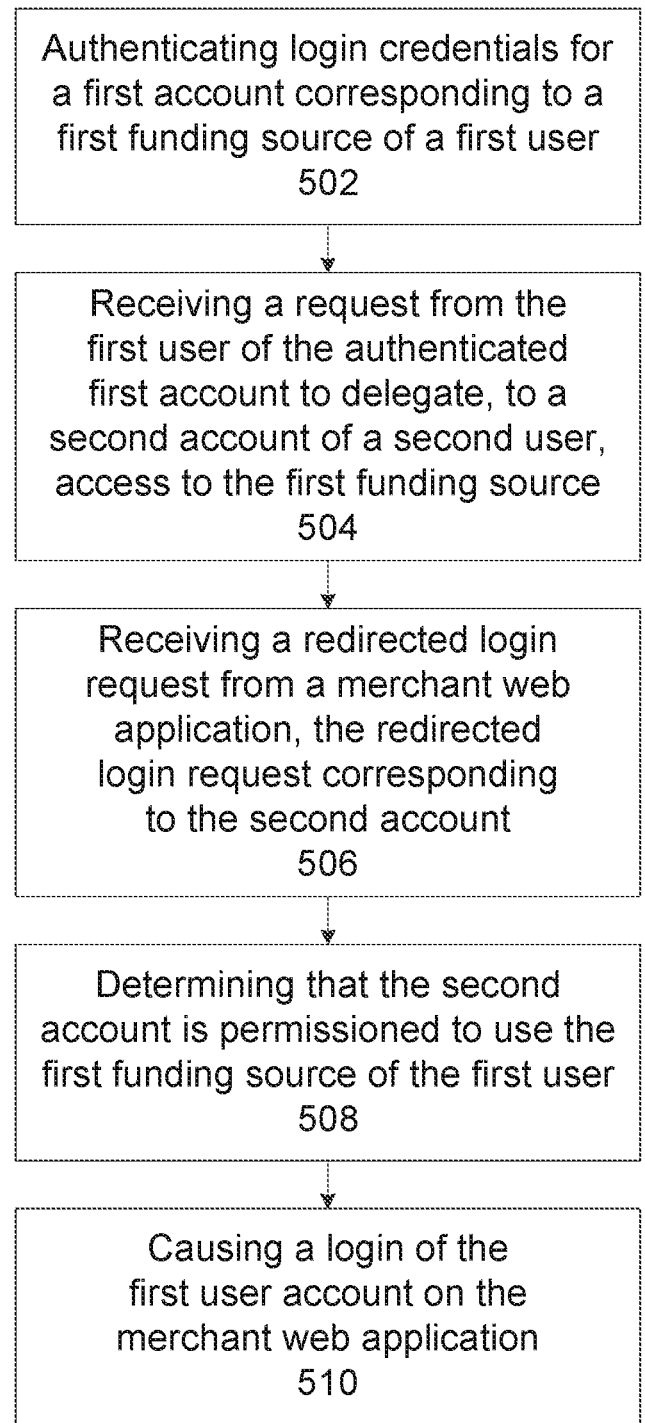
FIG. 5 is a flow chart illustrating an embodiment of a method for an account delegation use case during an electronic transaction, according to one embodiment.

FIG. 5 is an illustration of example method 500 for completing a purchase using delegated account permission, according to one embodiment. Method 500 may be performed by one or more applications at service provider server 170. More specifically, service provider server 170 may include a memory and one or more processors, where the processors execute the machine-readable code from the memory to perform the actions of method 500.

The service provider server 170 may receive login credentials for a first account corresponding to a first user (e.g., user 105). In this example, the login credentials correspond to a first funding source that the first user has with the service provider. At step 502, the service provider server 170 authenticates the login credentials for the first account corresponding to the first funding source of the first user. For example, the service provider server 170 may check the login credentials against known accounts to verify that the credentials are correct. Authentication may also include other forms of authentication, such as 2FA, KBA, and the like. The result of the authentication is that the service provider server 170 recognizes a valid login by the first user into her own account.

At step 504, a request is received from the first user of the authenticated first account to delegate, to a second account of a second user, access to the first funding source. With this delegation, user 107 is granted access to user 105's funding source. In some embodiments, certain restrictions on the funding source may be set by user 105 to limit how user 107 may utilize user 105's funding source. Examples of restrictions that may be set are discussed above with respect to FIG. 3.

At step 506, service provider server 170 receives a redirected login request from a merchant web application. The redirected login request, in this instance, corresponds to the second account. The redirected login is the result of user 107 logging in to the transaction site 146 on the merchant server 140 using credentials of user 107 and associated with the service provider. Accordingly, merchant server 140 redirects this login for authentication by service provider server 170.

At action 508, service provider server 170 determines that the second account is permissioned to use the first funding source of the first user. As such, service provider server 170 communicates with the merchant site in action 510 to cause a login of the first user account on the merchant web application, where the logging in of the first user account on the merchant web application causes the first funding source to be applied to an electronic transaction performed on the merchant web application under control of the second user. For instance, one or both of login integration applications 142, 172 may recognize a merchant site account linked with the first funding source account. In such an instance, the service provider server 170 may transmit a message to the merchant server 140 informing the merchant that the particular user is authenticated and is associated with one or both of the first funding source or the merchant account linked with the first funding source. The merchant server 140 then accepts the access of an authenticated user.

At this point, user 107 receives access to the merchant website as if logging in using credentials of user 105 in the sense that user 107 may use the first funding sources, but not otherwise have access to other content from the first account that corresponds to the first funding source, such as transaction history or other data associated with user 105. In some embodiments, user 105 may provide access to specific types of content from the first funding source, such as purchases made by user 107 or purchase restrictions for user 107.

In some embodiments, the service provider server 170 may check purchases at the merchant site against the set of restrictions. An example is provided above with respect to step 224 of FIG. 2, where the service provider server 170 may check various items or the purchase as a whole against merchandise restrictions, dollar limit restrictions, time window restrictions, or the like. Purchases that do not conform to the restrictions may be disallowed.

To complete the purchase, service provider server 170 applies the first funding source to the electronic transaction at the merchant site, assuming that the electronic transaction is within the restrictions. In other words, allowed purchases are paid for using a funding source of user 105 even though the purchases are made under control of user 107.

Various embodiments are not limited to the particular actions depicted in FIG. 5. Instead, other embodiments may add, omit, rearrange, or modify various actions. For instance, some embodiments may include a set up process, such as described above with respect to FIG. 3, including notifying the first user of the account delegation. In one example, notifying the user of the account delegation may include sending the user a link by either text or email, wherein the first user may click on the link and be taken to the merchant website. Additionally, method 500 may be repeated for a different merchant website, assuming that the first user has permission to use the account at other merchant websites.

Various embodiments may provide the functionality described with respect to FIGS. 2 and 5 even if user 107 does not already have an account established with transaction site 146. In such instance, the actions associated with FIG. 4 may be omitted, and user 107 may simply be provided access to the transaction site under the credentials of user 105 without being prompted to select an account.

As noted above, the scope of embodiments is not limited to making a payment and, thus, the actions of method 500 may be different in other embodiments. In one example, the service provider server 170 communicates with an online site during a login process of the first user. Examples of online sites may include a streaming service, and email service, a social media site, a travel booking site, and the like. The action further includes the service provider server 170 receiving first account credentials corresponding to a first account of the first user, similar to action 502. The service provider server 170 then determines that the first user has delegated access to a second account of a second user, as in actions 504-506. The service provider server may make that determination in response to receiving the first account credentials. The service provider server 170 may then transmit a message to the online site to login the first user to the online site under credentials of the second account, as in action 508. Continuing with an example in which the online site includes a media streaming service, the first user may login as the second user and stream media under the first user's own control. Of course, the second user may have set restrictions on access, such as content restrictions or time restrictions.

In another example, the online site may include a travel booking service, and the first user may log into the travel hooking service as the second user. The first user may then book travel for herself or for someone else (perhaps for the second user) and pay for the travel using a funding source of the second user and subject to any restrictions set by the second user. In yet another example, the online site may include a social media site, and the first user may log into the social media site as the second user. The first user may have freedom to post on behalf of the second user or to configure settings for the second user. In any event, the scope of embodiments includes delegated access to any kind of account and whether payment is made or not. The same or similar features may further be applied to applications or websites that provide collaboration, such as but not limited to, calendars and to-do lists.

Figure 6:
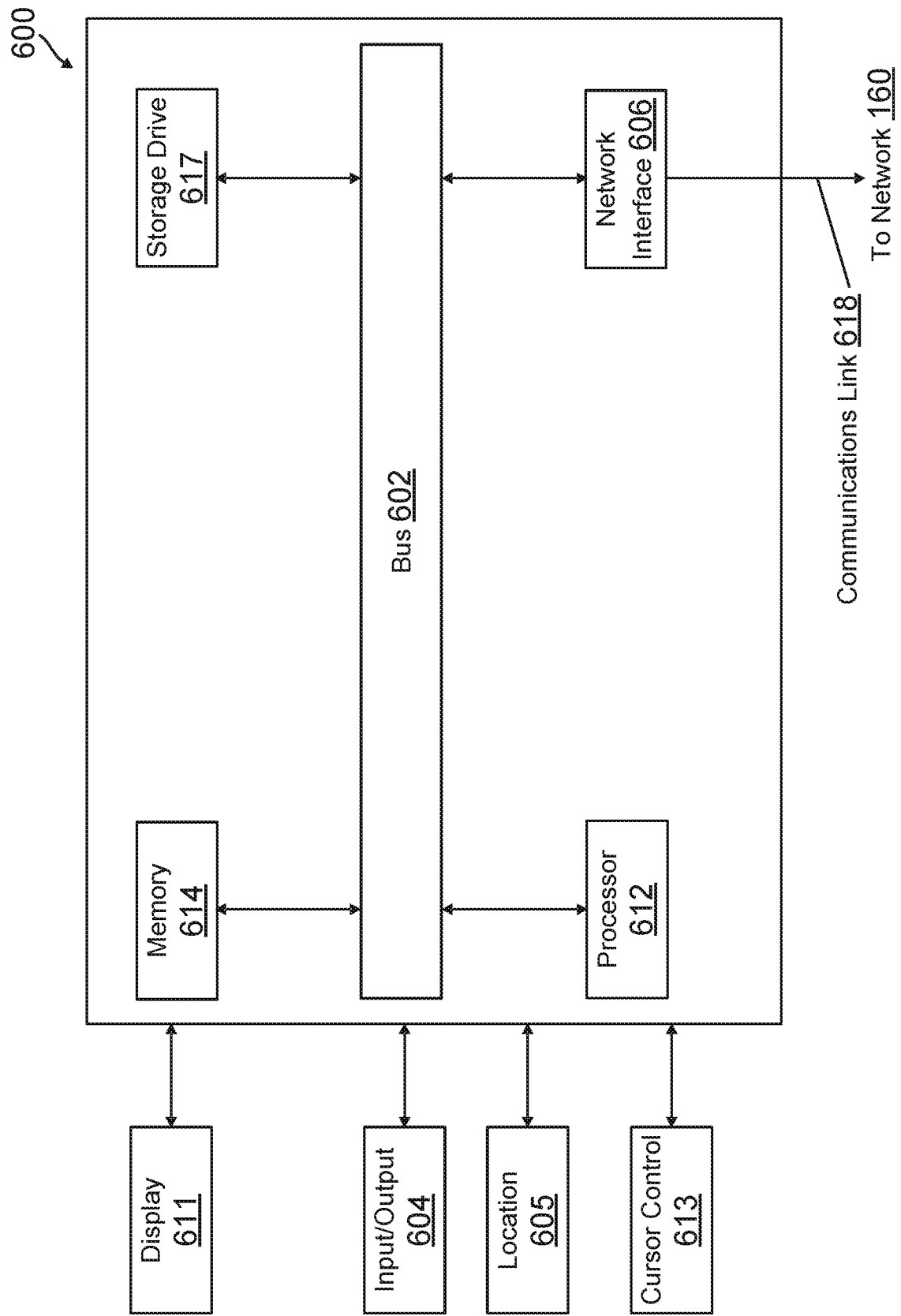
FIG. 6 is an illustration of an example computer system that may be used as a user device, a service provider server, or a merchant server and to perform the actions described with respect to FIGS. 1-5, according to one embodiment.

Referring now to FIG. 6, an embodiment of a computer system 600 suitable for implementing, for example, the computing devices 110, 112, 140, and 170 of FIG. 1 discussed above. It should be appreciated that other devices utilized in the system discussed above may be implemented as the computer system 600 in a manner as follows.

In accordance with various embodiments of the present disclosure, computer system 600, such as a smart phone, computer, and/or a network server, includes a bus 602 or other communication mechanism for communicating information, which interconnects subsystems and components, such as a processing component 612 (e.g., processor, microcontroller, digital signal processor (DSP), etc.), a system memory component 614 (e.g., RAM) a storage drive component 617 (e.g., solid-state, hard drive, or optical), a network interface component 606 (e.g., wireless card, modem, or Ethernet card), a display component 611 (e.g., a touchscreen, CRT, or LCD), an input/output component 604 (e.g., keyboard, keypad, a touchscreen), a cursor control component 613 (e.g., mouse, pointer, or trackball), and/or a location determination component 605 (e.g., a Global Positioning System (GPS) device as illustrated, a cell tower triangulation device, and/or a variety of other location determination devices known in the art). In one implementation, the storage drive component 617 may comprise a database having one or more storage drive components.

In accordance with embodiments of the present disclosure, the computer system 600 performs specific operations by the processor 612 executing one or more sequences of instructions contained in the memory component 614, such as described herein with respect to FIGS. 1-5 discussed above. Such instructions may be read into the system memory component 614 from another computer readable medium, such as storage drive 617. In other embodiments, hard-wired circuitry may be used in place of or in combination with software instructions to implement the present disclosure.

Logic may be encoded in a computer readable medium, which may refer to any tangible and non-transitory medium that participates in providing instructions to the processor 612 for execution. Such a medium may take many forms, including but not limited to, non-volatile media and volatile media. In various implementations, non-volatile media includes hard drive or solid-state drives, such as the storage drive component 617, and volatile media includes dynamic memory, such as the system memory component 614.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of the computer systems 600 coupled by a communication link 618 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

The computer system 600 may transmit and receive messages, data, information and instructions, including one or more programs (i.e., application code) through the communication link 618 and the network interface component 606. The network interface component 606 may include an antenna, either separate or integrated, to enable transmission and reception via the communication link 618. Received program code may be executed by processor 612 as received and/or stored in storage drive component 617 or some other non-volatile storage component for execution.

The present disclosure may be implemented using hardware, software, or combinations of hardware and software.

Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
   a non-transitory memory; and
   one or more hardware processors coupled to the non-transitory memory and configured to read instructions from the non-transitory memory to cause the system to perform operations comprising:
   receiving a first redirected login request from a merchant web application, the first redirected login request corresponding to a first account corresponding to a first funding source of a first user;
   authenticating login credentials for the first account;
   receiving a request from the first user of the authenticated first account to delegate, to a second account of a second user, an access to the first funding source;
   sending, in response to the first redirected login request, a billing agreement token for the first account to the merchant web application, wherein the billing agreement token enables a delegation of the access to the first funding source;
   subsequent to the billing agreement token being received by the merchant web application and a completion of the delegation of the access to the first funding source, sending a message to the second account notifying the second account of the delegation of the access to the first funding source, wherein the message includes a clickable link directed to the merchant web application;
   receiving a second redirected login request from the merchant web application, the second redirected login request corresponding to the second account;
   determining, based on the received request from the first user of the authenticated first account to delegate access to the first funding source, that the second account is permissioned through the first account to use the first funding source of the first user for the merchant web application; and
   causing, in response to determining that the second account is permissioned to use the first funding source of the first user, a login of the first account on the merchant web application,
   wherein the login of the first account is masked such that the merchant web application perceives a login of the second account instead of the first account, and
   wherein the masked login of the first account on the merchant web application causes the first funding source to be applied to an electronic transaction performed on the merchant web application under control of the second account.

2. The system of claim 1, wherein the received request to delegate access to the first funding source includes a set of restrictions that specify terms under which the first funding source may be applied to the electronic transaction.

3. The system of claim 2, wherein the set of restrictions includes requiring at least one of the electronic transaction to be made within a specified time period, the electronic transaction to be conducted at a set of authorized merchants, a total cost of the electronic transaction to be below a maximum monetary amount, or the electronic transaction to be for a product or a service included in a set of approved categories.

4. The system of claim 1, wherein the first account has a first linked relationship between a service provider and the merchant web application, and wherein the second account has a second linked relationship between the service provider and the merchant web application.

5. The system of claim 1, wherein the operations further comprise:
   receiving a request to perform a checkout for the electronic transaction; and
   performing, in response to the receiving the request to perform the checkout, a risk-based check to validate an identity of the second user,
   wherein the first funding source is applied to the electronic transaction in response to a verified result from performing the risk-based check.

6. A method comprising:
   receiving a first redirected login request from a merchant web application, the first redirected login request corresponding to a first account corresponding to a first funding source of a first user;
   authenticating, at a service provider server, login credentials for the first account;
   receiving, at the service provider server, a request from the first user of the authenticated first account to delegate, to a second account of a second user, an access to the first funding source;
   sending, in response to the first redirected login request, a billing agreement token for the first account to the merchant web application, wherein the billing agreement token enables a delegation of the access to the first funding source;
   subsequent to the billing agreement token being received by the merchant web application and a completion of the delegation of the access to the first funding source, sending a message to the second account notifying the second account of the delegation of the access to the first funding source, wherein the message includes a clickable link directed to the merchant web application;

receiving, at the service provider server, a second redirected login request from the merchant web application, the second redirected login request corresponding to the second account;

determining, at the service provider server based on the received request from the first user of the authenticated first account to delegate access to the first funding source, that the second account is permissioned through the first account to use the first funding source of the first user for the merchant web application; and causing, at the service provider server in response to determining that the second account is permissioned to use the first funding source of the first user, a login of the first account on the merchant web application, wherein the login of the first account is masked such that the merchant web application perceives a login of the second account instead of the first account, and wherein the masked login of the first account on the merchant web application causes the first funding source to be applied to an electronic transaction performed on the merchant web application under control of the second account.

7. The method of claim 6, wherein the received request to delegate access to the first funding source includes a set of restrictions that specify terms under which the first funding source may be applied to the electronic transaction.

8. The method of claim 7, wherein the set of restrictions includes requiring at least one of the electronic transaction to be made within a specified time period, the electronic transaction to be conducted at a set of authorized merchants, a total cost of the electronic transaction to be below a maximum monetary amount, or the electronic transaction to be for a product or a service included in a set of approved categories.

9. The method of claim 6, wherein the first account has a first linked relationship between a service provider and the merchant web application, and wherein the second account has a second linked relationship between the service provider and the merchant web application.

10. The method of claim 6, further comprising:
receiving a request to perform a checkout for the electronic transaction; and
performing, in response to the receiving the request to perform the checkout, a risk-based check to validate an identity of the second user,
wherein the first funding source is applied to the electronic transaction in response to a verified result from performing the risk-based check.

11. A non-transitory machine-readable medium having stored thereon machine-readable instructions executable to cause a machine to perform operations comprising:
receiving a first redirected login request from a merchant web application, the first redirected login request corresponding to a first account corresponding to a first funding source of a first user;
authenticating login credentials for the first account;
receiving a request from the first user of the authenticated first account to delegate, to a second account of a second user, an access to the first funding source;
sending, in response to the first redirected login request, a billing agreement token for the first account to the merchant web application, wherein the billing agreement token enables a delegation of the access to the first funding source;
subsequent to the billing agreement token being received by the merchant web application and a completion of the delegation of the access to the first funding source, sending a message to the second account notifying the second account of the delegation of the access to the first funding source, wherein the message includes a clickable link directed to the merchant web application;

receiving a second redirected login request from the merchant web application, the second redirected login request corresponding to the second account;

determining, based on the received request from the first user of the authenticated first account to delegate access to the first funding source, that the second account is permissioned through the first account to use the first funding source of the first user for the merchant web application; and causing, in response to determining that the second account is permissioned to use the first funding source of the first user, a login of the first account on the merchant web application, wherein the login of the first account is masked such that the merchant web application perceives a login of the second account instead of the first account, and wherein the masked login of the first account on the merchant web application causes the first funding source to be applied to an electronic transaction performed on the merchant web application under control of the second account.

12. The non-transitory machine-readable medium of claim 11, wherein the received request to delegate access to the first funding source includes a set of restrictions that specify terms under which the first funding source may be applied to the electronic transaction.

13. The non-transitory machine-readable medium of claim 12, wherein the set of restrictions includes requiring at least one of the electronic transaction to be made within a specified time period, the electronic transaction to be conducted at a set of authorized merchants, a total cost of the electronic transaction to be below a maximum monetary amount, or the electronic transaction to be for a product or a service included in a set of approved categories.

14. The non-transitory machine-readable medium of claim 11, wherein the first account has a first linked relationship between a service provider and the merchant web application, and wherein the second account has a second linked relationship between the service provider and the merchant web application.

15. The system of claim 1, wherein the operations further comprise:
receiving a request to perform a checkout for the electronic transaction; and
removing an item from the electronic transaction based on the delegation of the access to the first funding source.

16. The system of claim 1, wherein the operations further comprise:
receiving a request to perform a checkout for the electronic transaction; and
confirming that a shipping address for the electronic transaction is an approved address corresponding to a restriction set on the delegation of the access to the first funding source.

17. The method of claim 6, further comprising:
receiving a request to perform a checkout for the electronic transaction; and
removing an item from the electronic transaction based on the delegation of the access to the first funding source.

18. The method of claim 6, further comprising:
receiving a request to perform a checkout for the electronic transaction; and confirming that a shipping address for the electronic transaction is an approved address corresponding to a restriction set on the delegation of the access to the first funding source.

19. The non-transitory machine-readable medium of claim 11, wherein the operations further comprise:
   receiving a request to perform a checkout for the electronic transaction; and
   removing an item from the electronic transaction based on the delegation of the access to the first funding source.

20. The non-transitory machine-readable medium of claim 11, wherein the operations further comprise:
   receiving a request to perform a checkout for the electronic transaction; and
   confirming that a shipping address for the electronic transaction is an approved address corresponding to a restriction set on the delegation of the access to the first funding source.

\* \* \* \* \*

UNITED STATES PATENT AND TRADEMARK OFFICE
CERTIFICATE OF CORRECTION

PATENT NO. : 11,100,504 B2  
APPLICATION NO. : 16/237208  
DATED : August 24, 2021  
INVENTOR(S) : Yona Ju and Fun-Chen Jou Page 1 of 1

It is certified that error appears in the above-identified patent and that said Letters Patent is hereby corrected as shown below:

In the Specification

At Column 2, Line 60: Please replace "sip" with "sign"

At Column 8, Line 32: Please replace "hack" with "back"

At Column 13, Line 44: Please replace "hooking" with "booking"

Signed and Sealed this  
Twenty-first Day of December, 2021

Drew Hirshfeld  
*Performing the Functions and Duties of the*  
*Under Secretary of Commerce for Intellectual Property and*  
*Director of the United States Patent and Trademark Office*